United States Patent [19]

Drath

[11] 4,404,103
[45] Sep. 13, 1983

[54] ROCKING SWIVEL HOSE CONNECTORS AND METHOD

[76] Inventor: Edwin H. Drath, 1218 S. Patton, Arlington Heights, Ill. 60005

[21] Appl. No.: 318,558

[22] Filed: Nov. 5, 1981

[51] Int. Cl.³ .................... F16L 27/06; B01D 35/02
[52] U.S. Cl. ............................... 210/446; 210/451; 285/277
[58] Field of Search ............. 210/232, 416.1, 419, 210/429, 432, 435, 446, 451; 285/272, 273, 275, 276, 277

[56] References Cited

U.S. PATENT DOCUMENTS

| | | | |
|---|---|---|---|
| 985,166 | 2/1911 | Hall, Jr. | 210/446 |
| 998,884 | 7/1911 | Elvin | 285/273 X |
| 2,351,965 | 6/1944 | Hoffer | 210/446 X |
| 2,441,363 | 5/1948 | Krueger | 285/273 |
| 3,722,926 | 3/1973 | Fukushima | 285/275 X |

FOREIGN PATENT DOCUMENTS 638959 6/1950 United Kingdom ............... 285/273

Primary Examiner—John Adee
Attorney, Agent, or Firm—Hill, Van Santen, Steadman & Simpson

[57] ABSTRACT

A spherical rocking and swivel member, within a chamber in a body having a passageway therethrough and extending in part through axially outwardly facing shoulder means therein spaced inwardly from one end of the body, thrusts toward the shoulder means and has a hollow coupling stem thereon projecting outwardly relative to one end of the body. The spherical member and the stem have a fluid passage therethrough in continuous fluid flow communication with the passageway. Combination packing ring and nut lock means seal the swivel member and adjacent end of the body and lockingly retains a retaining ring nut relative to the body. Bearing means facilitate rocking and swivelling movement of the spherical member relative to the shoulder means. A method of making the hose connector is also covered.

32 Claims, 5 Drawing Figures

U.S. Patent  Sep. 13, 1983  4,404,103
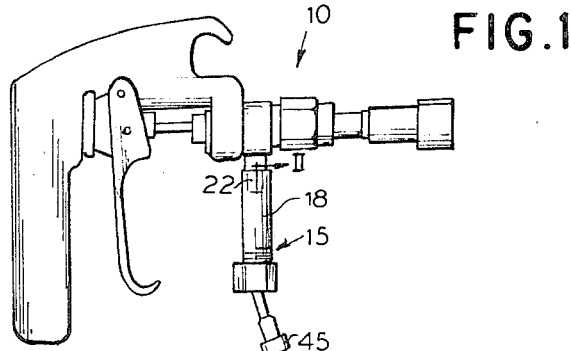
FIG.1
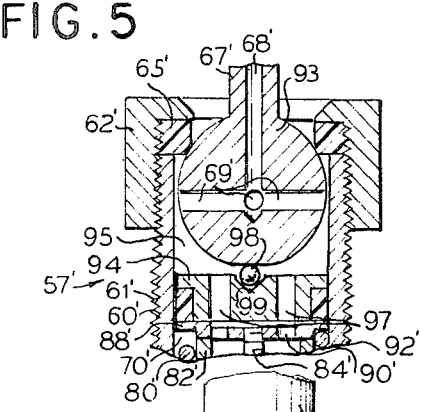
FIG.2
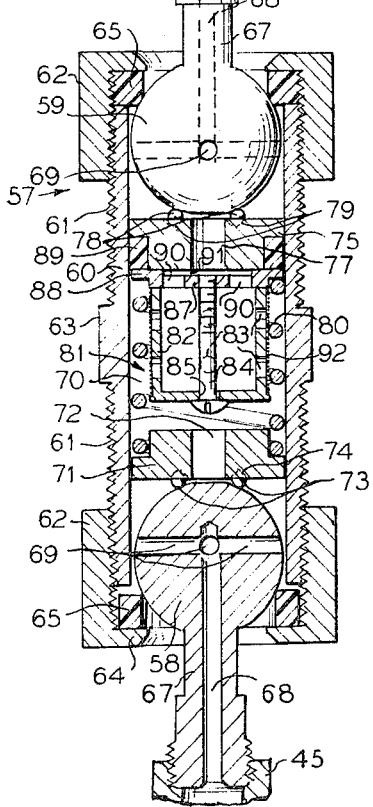
FIG.5
FIG.4
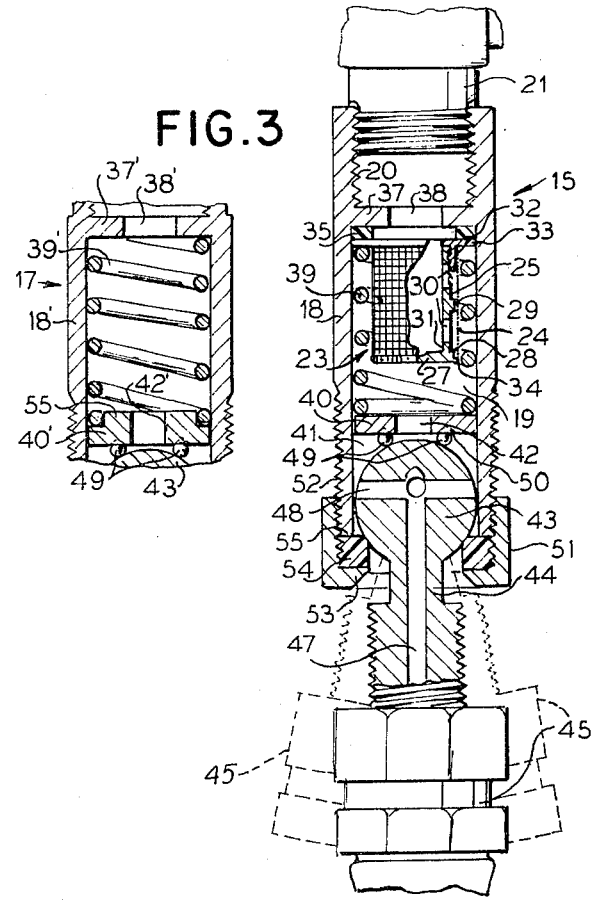
FIG.3

ROCKING SWIVEL HOSE CONNECTORS AND METHOD

This invention relates to new and improved rocking swivel hose connectors and method and is more particularly concerned with such connectors especially useful for high pressure sprayless painting lines.

Much modern day painting is effected by airless spraying at high pressures, e.g., 2000 psi or greater. The paint under pressure is delivered to spray guns through high pressure hose communicating with high pressure paint source, such as a pump or a filter attached to a pump.

Conventional couplings provide fixed orientation of the hose connections to not only the spray gun, but also to the high pressure source device. Where the operating length of hose requires sections of hose to be coupled together, those couplings are also conventionally fixed. Fixed couplings lead to twisting and shearing strains which can cause damage and eventual hose failure, with detrimental, damaging results. It is to the alleviation of this problem that the present invention is largely directed.

An important object of the invention is to provide a new and improved hose connector which is of simple and efficient structure, is rugged to withstand high pressure, permitting not only rocking but full swivelling of parts of the connector.

Another object of the invention is to provide a connector of the type described which has new and improved combination packing ring and nut lock means.

This invention provides a rocking swivel hose connector, comprising a body having a passageway therethrough extending in part through axially outwardly facing shoulder means therein spaced inwardly from one end of said body and providing a bottom for a chamber which opens through said one end, a spherical rocking and swivel member within said chamber and thrusting toward said shoulder means and having a hollow coupling stem thereon which projects outwardly relative to said one end of the body, said member and said stem having a fluid passage therethrough in continuous fluid flow communication with said passageway, and including, separately or in combination, as one aspect, bearing means facilitating rocking and swivelling movement of said member relative to said shoulder means and which may serve for spacing said member from said shoulder means for implementing said continuous fluid flow communication between said passage and said passageway; and as another aspect means for retaining said member in assembly within said chamber and permitting rocking and swivelling of said member and said projecting stem, and comprising a flanged clamping ring nut threadedly engaged on said one end of the body, and a combination packing ring and nut lock compressed by said ring nut sealingly against an annular surface at said one end of said body and against said rocking and swivel member and lockingly retaining said ring nut relative to said body.

This invention also provides a method of making a rocking swivel hose connector, comprising providing a body having a passageway therethrough extending in part through axially outwardly facing shoulder means therein spaced inwardly from one end of said body and providing a bottom for a chamber which opens through said one end; mounting a spherical swivel member within said chamber and with a hollow coupling stem on said member projecting outwardly relative to said one end of the body, there being a continuous fluid passage through said member and said stem communicating with said passageway; and including the steps of threadedly engaging on said one end of said body a flanged clamping ring nut and thereby effecting retention of said member in assembly within said chamber and permitting rocking swivelling of said member and said projecting stem and by threadedly driving said clamping ring nut compressing a combination packing ring and nut lock sealingly against an annular surface of said one end of said body and against said swivel member and effecting locking retention of said ring nut relative to said body; and/or the steps of providing bearing means facilitating rocking and swivelling movement of said member relative to said shoulder means, and effecting retention of said member in assembly within said chamber and permitting rocking swivelling of said member and said projecting stem.

Other objects, features and advantages of the invention will be readily apparent from the following description of certain representative embodiments thereof, taken in conjunction with the accompanying sheet of drawings, although variations and modifications may be effected without departing from the spirit and scope of the novel concepts embodied in the disclosure and in which:

FIG. 1 is a more or less schematic elevational and perspective view showing an airless spray painting apparatus including a pumping unit and a spraying implement connected thereto and utilizing rocking swivel hose connectors in association with the hose connecting the implement with the unit;

FIG. 2 is an enlarged longitudinal sectional detail view taken substantially along the line II—II of FIG. 1;

FIG. 3 is an enlarged fragmentary longitudinal sectional detail view taken substantially along the line III—III of FIG. 1;

FIG. 4 is a longitudinal sectional detail view showing a modification of the connector; and FIG. 5 is a fragmentary longitudinal sectional detail view showing another modification.

By way of example, FIG. 1 depicts an airless paint spraying implement 10, generally referred to as a spray gun, connected by means of a high pressure hose 11 to a pump unit 12, and more particularly to a filter assembly 13 of the unit, the material to be sprayed, e.g., paint, being supplied from a suitable source such as a container (not shown) to the unit 12 through a supply hose 14.

Attachment of the implement 10 to the hose 11 is desirably by means of a new and improved connector 15. Connection of the hose 11 to the unit 12 is desirably by means of a new and improved connector 17. Both of the connectors 15 and 17 are of a novel rocking swivel type which will avoid shearing and twisting strains on the hose 11 and afford maximum maneuverability of the implement 10 relative to the unit 12.

In a desirable construction, the connector 15 comprises a body 18 (FIGS. 1 and 2) in the form of an elongate tube having a passageway 19 therethrough. At one end, the body may be provided with internal threads adapting it to be threadedly coupled with an attachment nipple 21 on the implement 10. At this end of the body 18, it may be provided with wrenching flats 22.

Preferably the body 18 is of a length to accomodate a high pressure strainer assembly 23 adapted to withstand fluid paint pressures of 2000 psi or over. To this end, the strainer assembly 25 comprises a tubular filter screen 24 mounted about a rigid hollow core 25 having a solid cap 27 at one end, longitudinally spaced annular outer peripheral spacer lands 28 and 29, and ports 30 communicating through the wall of the core with a blind end passage 31. Opposite its cap end, the core 25 is threadedly engaged into a centrally ported annular centering and retainer flange 32 which has a radially outwardly extending annular base portion 33 cooperating with a complementary annular overhanging flange 34 on the cap 27 for engaging the screen 24 endwise therebetween. Within the connector passage 19, the filter assemble 23 is mounted with its base flange 32 engaging an annular gasket 35 lying upon an annular shoulder 37 integral with the body 18 and having a central passageway port 38 with which the core passage 31 communicates through the annular base flange 32. Retention of the filter assembly 23 on the shoulder 37 is by means of a compression spring 39 freely received in the space between the filter assembly 23 and thrusting endwise against the flange portion 33.

At its opposite end, the compression spring 39 extends substantially beyond the cap end of the filter assembly 23 and thrusts against shoulder means in the form of an annular disk 40 within the body 18 and spaced inwardly from the adjacent end of the body and providing a bottom for a chamber 41 which opens through the end. It will be observed that the chamber 41 is actually part of the passageway 19, and the shoulder disk 40 has a central opening 42 which thus forms part of the passageway.

Within the chamber 41 is mounted a spherical rocking and swivel member 43 which thrusts toward the shoulder disk 40 and has a coupling stem 44 which is adapted for connection to the hose 11 by means of a coupling 45 threadedly engaged on the stem. A fluid passage 47 extends longitudinally through the stem 44 and communicates at its inner end with fluid passage ports 48 which radiate from the inner end of the passage 47 for continuous fluid flow communication with the passageway 19 within the body 18. Bearing means conveniently comprising spaced ball bearings 49 mounted in and projecting from shallow sockets 50 in the outer face of the axially floating shoulder disk 40 and against which the spherical surface of the member 43 rides, space the member 43 from the shoulder disk 40 for implementing the continuous fluid flow communication of the passage 47, 48, and the passageway 19.

Means are provided for retaining the member 43 in assembly within the chamber 41 and permitting rocking and swivelling of the member 43 and the projecting stem 44 substantially as indicated in dash outline in FIG. 2, as compared to the full line showing. Desirably such retaining means comprise a flanged ring nut 51 threadedly engaged on the chambered end portion of the body 18 which is provided with external threads 52 for this purpose. A radially inwardly extending annular flange 53 on the nut 51, and of smaller inner diameter than the diameter of the spherical member 43 but of larger inner diameter than the adjacent portion of the stem 44, compresses a combination packing ring and nut lock 54 sealingly against an annular surface 55 at the adjacent end of the body 18 and sealingly against the member 43. In effecting the threaded driving of the ring nut 51 for compressing the combination packing ring and nut lock 54, axially inward thrust is applied to the member 43 in opposition to the bias of the compression spring 39 which places the spring through the thrust of the member 43 toward and against the shoulder disk 40 under biasing compression, thus maintaining a firm sealing engagement of the member 43 with the packing ring 54. Desirably, the ring 54 may be made from a plastic material, such as polytetrafluoroethylene. In its uncompressed state, the ring 54 is preferably of generally rectangular radial cross-section with its outside diameter freely receptive within the ring nut 51 and of an inside diameter less than the inside diameter of the chamber portion of the body 18, while the diameter of the rocking swivel member 43 is of larger diameter than the inside diameter of the ring 54 and proportioned relative to the diameter defining the chamber 41 to fit closely therein but in freely swivelling and rocking relation. Therefore, when the ring nut 51 is driven home, against the member 43, the ring 54 is caused to expand lockingly into the threads of the nut so that upon bottoming of the ring 54 against the body end surface 55, the ring 54 locks the nut 51 retainingly relative to the body 18. It will be appreciated, of course, that the biasing spring 39 will be chosen as to length and resistance to compression to afford ample thrust toward the rocking swivel member 43 to enable the compressive jamming of the ring 54 into the sealing as well as nut locking relationship by driving home of the ring nut 51. Of course, should access into the passageway 19 be desired, as for cleaning the strainer assembly 23, the flanged clamping ring nut 51 may be wrenched free.

The connector 17 is desirably the same as connector 15 except that the strainer or filter assembly is omitted since the attachment end of the connector body 18' is in fluid receiving relation to the pumping unit 12, in contrast to discharge relation as is the connector 15 with respect to the paint applicator implement 10. In the connector 17, the coiled compression spring 39' may thrust directly against the shoulder 37' about the passageway port 38' through the shoulder. At its opposite end, the spring 39' engages a shoulder disk 40', which similarly as the shoulder disk 40 is axially floatingly related to the inside diameter of the body 18'. About the passage port 42' of the shoulder disk 40' may be provided a centering boss 55 dimensioned to fit within the adjacent end of the spring 39'. In other respects, the connector 17 may be the same as the connector 15.

For some purposes, it may be desirable to connect two pieces of high pressure hose in a manner to prevent twisting or shearing distortions, and for this purpose a connector 57 (FIG. 4) may be employed and which provides similar spherical rocking and swivel members 58 and 59 at respectively opposite ends of a tubular body 60, which for this purpose, has respective sections on each end portion provided with external threads 61 for threaded engagement by respective flanged clamping ring nuts 62. Intermediate the threaded sections 61, the body may be provided with a wrench faced section 63.

Each of the nuts 62 has a clamping flange 64 which is adapted for compressing a combination packing ring and nut lock 65 to similar effect as desired in connection with the combination packing ring and nut lock 54 in FIG. 2. At the lower end of FIG. 4, the ring 65 is shown in its uncompressed condition. At the top of FIG. 4, the ring 65 is shown in the compressed sealing and nut locking condition.

Each of the members 58 and 59 has a hollow connection stem 67 thereon which has a longitudinal fluid passage 68 communicating at its inner end with radially branching passage ports 69 opening through the perimeter of the associated member 58 and 59 and adapted for continuous fluid flow communication with passageway 70 through the connector body 60.

The spherical member 58 thrusts toward a shoulder disk 71 which has a central passageway bore 72 and with respect to which blockage by the member 58 is avoided by spacer bearing means comprising ball bearings 73 fitting in and projecting from respective shallow sockets 74 in the outer face of the disk 71.

Similarly, the spherical member 59 thrusts toward a shoulder disk 75 having a central passageway port 77. Blockage of the port 77 by the member 59 is prevented by spacer means comprising an annular series of widely spaced ball bearings 78 accomodated in shallow bearing sockets 79. Extending between and thrusting outwardly toward and against the shoulder disks 71 and 75 is a coiled compression spring 80 which is of a length and compressed strength to apply adequate equal and opposite thrust force to maintain the spherical members 58 and 59 in properly sealed but rockable and swivelling relation to the sealing and lock nut rings 65.

If desired, a filter or strainer 81 may be mounted within the spring 80 and held in place by the spring against the shoulder disk 75. In a desirable construction, the strainer 81 comprises a generally cup-shaped core 82 having in its cylindrical wall an array of inlet ports 83. A bolt 84 extending through a bolt hole 85 in the closed end of the core 82 is threaded into a base disk 87 which has a radially outwardly extending annular flange 88 thrustingly engaged by the spring 80 and bearing against a sealing ring 89 carried by the shoulder disk 75. An annular series of ports in the base disk 87 open through an inset area 91 in the face of the base disk which faces the shoulder disk 75, and provide for communication from the inside of the strainer core 82 with the passage bore 77 in the disk 75. Carried about the core 82 is a filter or strainer screen 92. Through this arrangement, fluid flowing from the member 58 is strained on passing through the strainer 81 and then flows on through the passageway in the connector body 60 and through the passage provided by the member 59. Connection of the stems 67 of the members 58 and 59 with the ends of hose to be connected by the connector 57 may be effected by means of couplings 45 similar to the couplings 45 in FIG. 1.

If preferred, an arrangement as depicted in respect to the rocking swivel hose connector 57' in FIG. 5 may be employed comprising a spherical rocking and swivel member 93 thrusting toward shoulder means in the form of a disk 94 facing axially outwardly from the bottom of a chamber 95 which opens through one end of the body 60' which may be the same as the body 60 in FIG. 4. In the connector 57', however, the member 93 thrusts toward a solid central portion of the shoulder disk 94, and continuation of the passage 70' in the tubular body 60' through the shoulder disk 94 is by way of eccentrically spaced flow passageway ports 97 extending axially through the disk 94 and spaced from the bearing thrust of the member 93, bearing means conveniently and efficiently comprising a single ball bearing 98 extending outwardly from a central bearing socket 99 in the outer face of the disk 94 facilitating rocking and swivelling movement of the member 93. In other respects, the connector 57' may be the same as the connector 57 in FIG. 4, and similar primed reference numerals identify equivalent elements in FIG. 5.

It will be understood that variations and modifications may be effected without departing from the spirit and scope of the novel concepts of this invention.

I claim as my invention:

1. A rocking swivel hose connector, comprising:
    a body having a passageway therethrough extending in part through axially outwardly facing shoulder means therein spaced inwardly from one end of said body and providing a bottom for a chamber which opens through said one end;
    a spherical rocking and swivel member within said chamber and thrusting toward said shoulder means and having a hollow coupling stem thereon which projects outwardly relative to said one end of the body;
    said member and said stem having a fluid passage therethrough in continous fluid flow communication with said passageway;
    means for retaining said member in assembly within said chamber and permitting rocking and swivelling of said member and said projecting stem, and comprising a flanged clamping ring nut threadedy engaged on said one end of the body, and a combination packing ring and nut lock compressed by said ring nut sealingly against an annular surface at said one end of said body and against the spherical surface of said rocking and swivel member and lockingly retaining said ring nut relative to said body;
    and bearing means facilitating rocking and swivelling movement of said member relative to said shoulder means.

2. A hose connector according to claim 1, wherein said shoulder means comprise a disk having passageway port therethrough and supported in axially floating relation by a coiled compression spring normally biasing the disk firmly toward said rocking and swivel member.

3. A hose connector according to claim 2, including a strainer in said spring and retained in assembly with said disk by said spring.

4. A hose connector according to claim 1, comprising a hose coupling coupled to said coupling stem.

5. A hose connector according to claim 1, wherein the opposite end of said body has means for attaching it to associated apparatus.

6. A hose connector according to claim 1, wherein the opposite end of said body has outwardly facing shoulder means, spherical rocking and swivel member and coupling stem, means for retaining the member in assembly within a chamber in said opposite end of said member, and bearing means, the same as said at said one end of said body.

7. A hose connector according to claim 6, including a coiled compression spring thrusting said shoulder means axially oppositely and firmly toward said rocking and swivel members at the opposite ends of said body.

8. A hose connector according to claim 1, wherein said shoulder means comprises an element having a central passageway bore therethrough, and said bearing means comprise a plurality of ball bearings mounted on said shoulder element in shallow sockets located about said central bore and maintaining said rocking and swivel member in a spaced relation for implementing continuous fluid flow communication of said passage and passageway through said central bore.

9. A hose connector according to claim 1, wherein said shoulder means comprises an element having passageway port means therethrough eccentric to a central bearing area, and said central bearing area having said bearing means in the form of a ball bearing element mounted in a shallow central socket in said area and projecting from said socket for maintaining said spherical member spaced from said shoulder means.

10. A rocking swivel hose connector, comprising:
a body having a fluid flow passageway therethrough extending in part through axially outwardly facing shoulder means therein spaced inwardly from one end of said body and providing bottom for a chamber which opens through said one end;
a spherical rocking and swivel member within said chamber and thrusting toward said shoulder means and having a hollow coupling stem thereon which projects outwardly relative to said one end of the body;
said member and said stem having a fluid passage therethrough in continuous fluid flow communication with said passageway;
means for retaining said member in assembly within said chamber and permitting rocking and swivelling of said member and said projecting stem;
said shoulder means having a passageway port therethrough directed toward said member;
and ball bearing means spacing said member from said shoulder means and facilitating rocking and swivelling movement of said member relative to said shoulder means and permitting free fluid flow between said port and said fluid passage.

11. A hose connector according to claim 10, wherein said shoulder means comprise a disk having said passageway port therethrough and supported in axially floating relation by a coiled compression spring normally biasing the disk firmly toward said rocking and swivel member.

12. A hose connector according to claim 11, including a strainer in said spring and retained in assembly with said disk by said spring.

13. A hose connector according to claim 10, comprising a hose coupling coupled to said coupling stem.

14. A hose connector according to claim 10, wherein the opposite end of said body has means for attaching it to associated apparatus.

15. A hose connector according to claim 10, wherein the opposite end of said body has outwardly facing shoulder means, a spherical rocking and swivel member and coupling stem, means for retaining the member in assembly within a chamber in said opposite end of said member, and bearing means, the same as said at one end of said body.

16. A hose connector according to claim 15, including a coiled compression spring thrusting said shoulder means axially oppositely and firmly toward said rocking and swivel members at the opposite ends of said body.

17. A hose connector according to claim 10, wherein said shoulder means comprises an element having said passageway port centrally therethrough, and said bearing means comprise a plurality of ball bearings mounted on said shoulder element in shallow sockets located about said central bore and engaging and maintaining said rocking and swivel member in a spaced relation for implementing continuous fluid flow communication of said passage and passageway through said central bore.

18. A hose connector according to claim 10, wherein said shoulder means comprises an element having passageway port means therethrough eccentric to a central bearing area, and said central bearing area having said bearing means.

19. A rocking swivel hose connector, comprising:
a body having a fluid flow passageway therethrough extending in part through axially outwardly facing shoulder means therein spaced inwardly from one end of said body and providing a bottom for a chamber which opens through said one end;
a spherical rocking and swivel member within said chamber and thrusting toward said shoulder means and having a hollow coupling stem thereon which projects outwardly relative to one end of the body;
said member and said stem having a fluid passage therethrough in continuous fluid flow communication with said passageway;
and means for retaining said member in assembly within said chamber and permitting rocking and swivelling of said member and said projecting stem, and comprising a flanged clamping ring nut threadedly engaged on said one end of the body, and a combination packing ring and nut lock compressed by said ring nut sealingly against an annular surface at one end of said body and against the spherical surface of said rocking and swivel member and lockingly retaining said ring nut relative to said body.

20. A hose connector according to claim 19, wherein said shoulder means comprise a disk having passageway port therethrough and supported in axially floating relation by a coiled compression spring normally biasing the disk firmly toward said rocking and swivel relation.

21. A hose connector according to claim 20, including a strainer in said spring and retained in assembly with said disk by said spring.

22. A hose connector according to claim 19, comprising a hose coupling coupled to said coupling stem.

23. A hose connector according to claim 19, wherein the opposite end of said body has means for attaching it to associated apparatus.

24. A hose connector according to claim 19, wherein the opposite end of said body has outwardly facing shoulder means, a spherical rocking and swivel member and coupling stem, means for retaining the member in assembly within a chamber in said opposite end of said member, and bearing means, the same as said at one end of said body.

25. A hose connector according to claim 24, including a coiled compression spring thrusting said shoulder means axially oppositely and firmly toward said rocking and swivel members at the opposite ends of said body.

26. A hose connector according to claim 19, wherein said shoulder means comprises an element having a central passageway bore therethrough, and said bearing means comprise a plurality of ball bearings mounted on said shoulder element about said central bore and maintaining said rocking and swivel member in a spaced relation for implementing continuous fluid flow communication of said passage and passageway through said central bore.

27. A hose connector according to claim 19, wherein said shoulder means comprises an element having passageway port means therethrough eccentric to a central bearing area, and said central bearing area having said bearing means.

28. A method of making a rocking swivel hose connector, comprising:

providing a body having a passageway therethrough extending in part through axially outwardly facing shoulder means therein spaced inwardly from one end of said body and providing a bottom for a chamber which opens through said one end;

mounting a spherical swivel member within said chamber and with a hollow coupling stem on said member projecting outwardly relative to said one end of the body, there being a continuous fluid passage through said member and said stem communicating with said passageway;

threadedly engaging on said one end of said body a flanged clamping ring nut and thereby effecting retention of said member in assembly within said chamber and permitting rocking swivelling of said member and said projecting stem;

and by threadedly driving said clamping ring nut compressing a combination packing ring and nut lock sealingly against an annular surface of said one end of said body and against the spherical surface of said swivel member and effecting locking retention of said ring nut relative to said body.

29. A method according to claim 28, comprising providing said combination packing ring and nut lock in the form of a polytetrafluoroethylene ring which is of initial outside diameter to fit freely within the ring nut and of an inside diameter smaller than said spherical member, and in said compressing expanding said ring into locking retention with said ring nut.

30. A method of making a rocking swivel hose connector, comprising:

providing a body having a passageway therethrough extending in part through axially outwardly facing shoulder means therein spaced inwardly from one end of said body and providing a bottom for a chamber which opens through said one end;

mounting a spherical swivel member within said chamber and with a hollow coupling stem on said member projecting outwardly relative to said one end of the body, there being a continuous fluid passage through said member and said stem communicating with said passageway;

providing bearing means spacing said member from, and facilitating rocking and swivelling movement of said member relative to, said shoulder means;

and effecting retention of said member in assembly within said chamber and permitting rocking swivelling of said member and said projecting stem.

31. A method according to claim 30, comprising effecting said retention by threadedly engaging on said one end of said body a flanged clamping ring nut.

32. A method according to claim 31, including threadedly driving said ring nut into compressing relation to a combination packing ring and nut lock and thereby effecting sealing engagement of the ring against an annular surface of said one end of said body and against said swivel member and effecting locking retention of said ring nut relative to said body.

* * * * *